United States Patent Office 3,711,439
Patented Jan. 16, 1973

3,711,439
STABILIZED POLYURETHANE COMPOSITIONS
Frederic Christian Loew, Ridgewood, N.J., assignor to Inmont Corporation, New York, N.Y.
No Drawing. Filed Nov. 27, 1970, Ser. No. 93,410
Int. Cl. C08g 51/60
U.S. Cl. 260—45.8 N  4 Claims

ABSTRACT OF THE DISCLOSURE

Improving the hydrolytic stability of thermoplastic elastomer polyurethanes containing polycarbodiimide as hydrolysis stabilizer, by adding certain minor proportions of N-(trichloromethylthio) phthalimide.

---

This invention relates to polyurethane compositions of superior hydrolytic stability and relates more particularly to microporous sheets, suitable for use as shoe upper materials, made of thermoplastic elastomeric polyurethane.

It is well known in the art to add carbodiimides, and in particular polycarbodiimides, to polyurethanes for the purpose of increasing the hydrolytic stability of the polyurethane. One such polycarbodiimide stabilizer is sold under the designation "PCD." It has ben reported in the trade literature (bulletin dated Mar. 31, 1965 from New Product Development Laboratory, B.F. Goodrich Chemical Co., Avon Lake, Ohio, "Hydrolytic Stability of Fungitrol II Protected Estane Compounds" by F. L. Pittenger, Project 3086–72 FLP–6–65) that the introduction of a Fungitrol II (which is N-[trichloromethylthio]phthalimide) into a polyurethane containing PCD resulted in a decrease in the hydrolytic stability of the stabilized polyurethane.

It has now been found, surprisingly, that an increase in the stability of the polyurethane containing PCD can be attained by incorporating therein the N-(trichloromethylthio) phthalimide in such proportions that the mol ratio of carbodiimide groups (—N=C=N—) groups of the polycarbodiimide to the

groups of the N-(trichloromethylthio) phthalimide is in the range of about 4:1 to 15:1, e.g. in the range of about 4:1 to 10:1.

The following example is given to illustrate this invention more fully. In the example all pressures are atmospheric unless otherwise indicated. In the application all proportions are by weight unless otherwise indicated.

EXAMPLE 1

A solution of 31% of thermoplastic elastomeric polyurethane in N,N-dimethylformamide ("DMF") is mixed with the ingredients listed in the tabulation below, in the amounts there indicated. Each mixture is cast in a thin layer, from which the DMF is evaporated (under vacuum at about 60–70° C.) to form a film ¼ mm. thick, and the resulting films are tested for hydrolytic stability by exposing them to 100% relative humidity at 100° C. for various times and measuring the change in the intrinsic viscosity ("I.V.") of the polymer. The following results are obtained:

| Addition | Ratio of I.V. after exposure to initial I.V. | |
|---|---|---|
| | After 20 hours | After 30 hours |
| a........ None.................................. | 0.285 | 0.241 |
| b........ 1% Fungitrol II...................... | 0.210 | ........ |
| c........ 1.5% PCD............................ | 0.319 | 0.252 |
| d........ 3% PCD.............................. | 0.336 | 0.287 |
| e........ 1.5% PCD plus 1% Fungitrol II..... | 0.315 | 0.225 |
| f........ 3% PCD plus 1% Fungitrol II....... | 0.389 | 0.320 |

EXAMPLE 2

In this example the additives are likewise incorporated into a solution of 31% of thermoplastic elastomeric polyurethane in DMF and the solution is then converted to a water vapor-permeable microporous sheet by mixing with micropulverized sodium chloride, casting the mixture as a layer onto a support and coagulating the layer (and leaching out the salt and DMF) by immersing the layer on the support into a water bath. The resulting layer, stripped from the support and dried, is then exposed to 100% relative humidity at 100° C. for 24 hours and the loss of I.V. is measured. The following results are obtained:

| Addition: | Ration of I.V. after exposure to initial I.V. |
|---|---|
| (a) None | 0.673 |
| (b) 3% PCD | 0.774 |
| (c) 3% PCD plus 0.5% Fungitrol II | 0.836 |

The intrinsic viscosity is determined in highly dilute solution in analytic grade DMF which has been thoroughly dried by storage under a nitrogen atmosphere over a molecular sieve (Linde 5A). Four measurements at 25° C. corresponding to four, approximately equally spaced, concentrations are made.

Typically the polyurethane used in the above examples is formed in the following manner: To 2398 g. of N,N-dimethylformamide ("DMF") in a reactor are added (at room temperature) 531.5 g. Desmophen 2001 polyester (a hydroxyl-terminated polyester of 2000 molecular weight, having a hydroxyl number of about 55.5 mg. KOH per g., made from about 1 mol butane diol-1,5, 1.13 mol ethylene glycol and 2 mols adipic acid), 122.7 g. 1,4-butanediol, 0.048 g. p-toluene-sulfonic acid monohydrate and 0.331 g. dibutyl tin dilaurate to form a uniform solution. Then 448 g. diphenylmethane-p-p' diisocyanate are added with stirring. The unreacted isocyanate content is determined by titration at intervals during the reaction, which is carried out at about 50° C. After the —NCO content has been stable for at least 20 minutes, an amount of 1,4-butanediol to provide one alcoholic hydroxyl for each unreacted isocyanate group is added. The viscosity of the solution increases over several hours to 2000 poise (Brookfield, spindle 5 or 6, measured at 25° C.). Shortly thereafter, 0.1% (based on the total weight of the mixture) of butanediol is added as a 50/50 mixture with methanol. The final reaction mixture is discharged and cooled. The final solution viscosity of the 31.9% solution is about 2400 poises; the final intrinsic viscosity is about 1.1 (measured at 25° C.).

The process is carried out under substantially anhydrous conditions. The reactor is predried by flushing dry nitrogen through it at 80° C. and is then cooled under nitrogen to room temperature before the ingredients are charged thereto. The ingredients are added under a nitrogen blanket. The DMF is added first (after it has passed through a column of a molecular sieve for removal of traces of water); next the polyester, butanediol and catalyst are added in that order and the mixture is agitated for 15 minutes. The diisocyanate is then added while stirring and the reactor is sealed and the agitation is effected at a higher rate for the remainder of the reaction.

A water vapor-permeable microporous sheet may be made as follows: 800 g. of the polyurethane solution is mixed into 427 g. of micropulverized sodium chloride (average particle size 10 microns, maximum particle size 52 (microns) contained in a one gallon, two-arm kneader. After being mixed for 65 minutes, the mixture is degassed at 4 mm. Hg for about 30 minutes, spread between 3.25 mm. shims onto a porous temporary support (e.g. a sintered polyethylene sheet treated with "Duponol ME" surfactant), immersed in 20° C. water for one hour, then overnight in 57° C. water, dried and removed from the temporary support.

The "Stabaxol PCD" used in the foregoing example is triisopropylbenzene polycarbodiimide (see British Pat. 986,200, Example 1) having the general formula

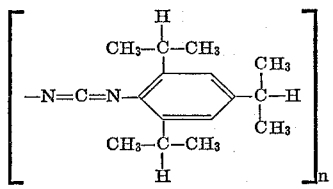

It is supplied commercially as "Stabaxol PCD" (which contains 2% admixed organic material to prevent lump formation) as fine light brown granules of specific gravity 1.05, and begin to sinter rapidly above about 50° C., is of resin-like viscosity above 70° C. and flows slowly above about 90° C. It is very easily soluble in petrol, benzene, carbon tetrachloride and ethyl acetate and practically insoluble in ethyl alcohol and water.

The proportion of polycarbodiimide used in the mixture is generally within the range of about 0.05–5%, based on the weight of polyurethane.

The Fungitrol 11 is N-(trichloromethylthio) phthalimide which is supplied commercially in about 88% purity.

It is within the broader scope of his invention to substitute other N-trichloromethylthio imides for all or part of the N-trichloromethylthio phthalimide. Examples of such substituted imides are given in U.S. Pat. 2,553, 770 of May 22, 1951 whose disclosure of such substituted imides is incorporated herein by reference. It is also within the broader scope of the invention to substitute an N-dichloromonofluoromethylthioimide for all or part of the N-trichloromethylthio phthalimide; such compounds are disclosed in British Pat. 927,834 and 1,023,393.

It is also within the broader scope of the invention to use other carbodiimides in place of all or part of the PCD. Examples of such carbodiimides which are known stabilizers against hydrolysis are found in British Pat. 986,200, whose disclosure of carbodiimides is incorporated herein by reference; that patent describes particularly the use of polycarbodiimides having a molecular weight of at least 500 and having more than 3 carbodiimide groups, such as polycarbodiimides in which the monomeric unit is a carbodiimide group attached to a divalent hydrocarbon group.

Other ingredients may be present in the blend, such as fillers, antioxidants such as phenolic antioxidants, etc. pigments (e.g. carbon black), stabilizing amounts of very fine silica particles (e.g. below about 40 m$\mu$ particle size) such as "Aerosil A200" or 'Aerosil R972" (an acidic silica) which may be present in proportions of, say, 1%, 3%, 5% or 10% based on the weight of polyurethane. More specifically, the material sold as Aerosil R.972 is described by its manufacturer as having an average particle size of about 20 millimicrons, as being a finely divided silica made hydrophobic by reaction with a cholorosilane (dimethyl dichlorosilane) and as having a large surface area, e.g. a surface area of about 90 to 150 m.$^2$/g. A 4% by weight dispersion in a 1:1 methanol: water blend exhibits a pH of 3.6 to 4.0. Further details are found in 'Chemiker- Zeitung/Chemische Apparatus" 89 (1965) 437–440 (Dr. Alfred Huthig Verlag G.m.b.H., Heidelberg, Germany).

The invention has found its greatest utility in the stabilization of very high molecular weight thermoplastic elastomeric polyurethanes having intrinsic viscosites above 0.8 and preferably 1.0 to 1.4, e.g. 1.1 to 1.2. The polyurethane is preferably produced by the reaction of a hydroxyl-terminated prepolymer with a diisocyanate and a diol.

The hydroxyl-terminated prepolymer preferably has a molecular weight below 6000 and more preferably between 800 and 2500; a molecular weight of 1800–2200 is particularly preferred. It may be a polyester of a hydroxycarboxylic acid (e.g. a polycaprolactone) or a polyester of a glycol and a dicarboxylic acid (e.g. ethylene glycol adipate or 1,4-butanediol adipate) or a mixed polyester of these types of components. Examples of other dicarboxylic acids which may be used instead of, or in addition to, adipic acid, are succinic, pimelic, suberic, azelaic or sebacic acids or aromatic acids such as phthalic acid or terephthalic acid. Examples of other glycols which may be used to make the polyester are 1,6-hexanediol and 1,8-octanediol. The most useful polyesters are aliphatic polyesters in which the

groups are separated by aliphatic chains averaging about 3 to 6 carbon atoms in length. A prepolymer which provides flexible or "soft" segments in the polyurethane molecule is preferred.

The hydroxyl-terminated prepolymer may be a polyether. Typical polyethers which are used to provide the soft segments for elastomeric polyurethanes are usually of aliphatic character. One type has the formula H (RO)$_n$ where R is a divalent alkylene radical, such as tetramethylene or ethylene or propylene, and $n$ denotes the degree of polymerization.

The preferred diisocyanate is diphenyl methane -p,p'-diisocyanate, but other diisocyanates may be used as such or in admixture therewith. Examples of other diisocyanates are 2,4-toluene diisocyanate, p,p'-diphenyl diisocyanate and tetramethylene diisocyanate. The most suitable diisocyanates have molecular weights below 500.

The chain extender is preferably a low molecular weight glycol. A particularly preferred chain extender is tetramethylene glycol. Others are ethylene glycol, diethylene glycol, hexamethylene glycol or octamethylene glycol. Both hydroxy groups of the glycol are preferably primary hydroxyls, and the glycol is preferably unbranched (having no branches such as dependent methyl or ethy groups).

In the preferred class of polyester polyurethane made with diphenylmethane-p,p'-diisocyanate, those having nitrogen contents in the range of 4 to 5%, most preferably in the neighborhood of 4½, (e.g. 4.4–4.6%) have been found to be particularly suitable.

A particularly suitable polyurethane is made from a polyester prepolymer of at least 1500 molecular weight, the proportions of aromatic diisocyanate, polyester and chain extender being such that the high molecular weight polyurethane is insoluble in 10% concentration in tetrahydrofuran at room temperature.

In preparing the polyurethane it is preferred to use a multistage reaction method in which the proportion of the reactants supplied to the earlier stage, i.e. to the reaction of the hydroxyl-terminated linear prepolymer, diisocyanate and diol chain extender, are such that there is a small stoichiometric excess of isocyanate groups (an excess of less than 20 mol percent, e.g. 5 to 15 mol percent) and the reaction is continued, in the solvent, until the isocyanate content reaches a constant level, as shown by analysis of a sample of the reaction mixture, (for instance by titration with a 0.01 N solution of n-dibutylamine in dry tetrahydrofuran). At this time there are substantially no unreacted hydroxyl groups in the reaction mixture. Then, in the later stage, an amount of diol chain extender sufficient to provide one alcoholic hydroxyl group for each unreacted isocyanate group, as determined by that analysis, is added; the ensuing reaction of the isocyanate and hydroxyl groups is continued at controlled temperature and the viscositiy of the mixture is measured during this reaction until a viscosity corresponding to an intransic viscosity in the range of about 0.9 or 0.95 to 1.4 is reached. At this time an end-capping reagent, such as an alcohol (e.g. methanol or butanediol) or other chain-terminating reactant is added to stop the reaction.

The amount of diol chain extender supplied to the later stage is below 20 mol percent (e.g. in the range of about 5 to 15 mol percent) of the amount of chain extender present in the earlier stage.

The stabilized polyurethanes in accordance with this invention are especially useful for the production of shoe upper material whose base is a microporous sheet consisting essentially of elastomeric polyurethane material. Unlike conventional leather substitutes which have ultimate elongations of some 20–40%, these sheets do not have their extensibility constrained by the presence of a reinforcing fabric (such as a woven or non-woven fibrous fabric) and can be stretched well over 50% (e.g. well over 100% and usually well over 200%). In a preferred form of the invention the solution of the high molecular weight elastomeric polyurethane is mixed with finely divided pore-forming microscopic particulate material (preferably microscopic sodium chloride particles) the mixture is shaped into sheet form and treated so as to add water to the shaped mixture so as to coagulate the polyurethane (which although soluble in DMF is insoluble in a DMF–water mixture containing some 12% water). The coagulated sheet is then treated to remove all the pore-forming particles, e.g. by leaching with hot water, to dissolve out all the salt.

For use as shoe upper material, the cast thickness is preferable such that after coagulation, leaching and drying the resulting microporous sheet is about 0.6 to 2 mm. thick.

For use in making shoe upper materials the preferred polyurethanes have melting points of at least 100° C. preferably above 150° C. (e.g. about 170 to 200° C., as measured by differential thermal analysis or differential scanning calorimetry). When formed into a smooth void-free thin film 0.2–0.4 mm. in thickness they have the properties described below: a tensile strength of at least 210 kilograms per square centimeter (preferably at least 350, e.g. about 420 to 560), a percent elongation at break of at least 300% (preferably at least 400%, e.g. about 500 to 700%), an elastic modulus of at least 105 kilograms per square centimeter (preferably at least 350 e.g. about 560 to 770), a 100% secant modulus (stress divided by strain at 100% elongation) of at least 28 kilograms per square centimeter (preferably at least 84, e.g. about 110 to 134). These mechanical properties are measured by ASTM D882–67.

It is understood that the foregoing detailed description is given merely by way of illustration and that variations may be made therein without departing from the spirit of the invention. The "Abstract" given above is merely for the convenience of technical searchers and is not to be given any weight with respect to the scope of the invention.

I claim:

1. A polyurethane having admixed therewith a polycarbodiimide stabilizer against hydrolysis of the polyurethane and a N-(trichloromethylthio) phthalimide the proportions of said polycarbodiimide and said thio imide being such as to provide a mol ratio of —N=C=N—groups to —NSC groups in the range of about 4:1 to 8:1, said polyurethane being an elastomer having carboxylic ester groups in its polymer chain and having an intrinsic viosisity prior to stabilization of above 0.8 and said polycarbodiimide having a molecular weight of at least 500 and being present in a proportion based upon the weight of the polyurethane of about 0.5 to 5%.

2. A polyurethane as in claim 1 containing poly(triisopropylbenzene) polycarbodiimide.

3. A polyurethane as in claim 1 in a microporous water vapor-permeable form.

4. A polyurethane as in claim 2 in the form of a microporous water vapor-permeable sheet material in a shoe upper.

References Cited

UNITED STATES PATENTS

| | | | |
|---|---|---|---|
| 2,553,770 | 5/1951 | Kittelson | 260—326 |
| 3,193,525 | 7/1965 | Kallert et al. | 260—45.9 |
| 3,471,423 | 10/1969 | Elmer et al. | 260—22 |

OTHER REFERENCES

Chemical Abstracts, vol. 65 (1966), citation 13949f.

Bulletin dated March 31, 1965 from New Product Development Laboratory, B. F. Goodrich Chemical Co., Avon Lake, Ohio "Hydrolytic Stability of Fungitrol II Protected Estane Compounds" by F. L. Pittenger, Project 3086-71 FLP-6-65.

DONALD E. CZAJA, Primary Examiner

J. P. HOKE, Assistant Examiner

U.S. Cl. X.R.

260—2.5 B, 37 N, 45.9 R 2.5 AY

UNITED STATES PATENT OFFICE
CERTIFICATE OF CORRECTION

Patent No. 3711439            Dated January 16, 1973

Inventor(s) Frederic Christian Loew

It is certified that error appears in the above-identified patent and that said Letters Patent are hereby corrected as shown below:

In the heading, insert after "Filed November 27, 1970, Serial No. 93,410", -- Claims priority, application Great Britain, December 9, 1969, 60144/69 --

Signed and sealed this 10th day of July 1973.

(SEAL)
Attest:

EDWARD M. FLETCHER, JR.
Attesting Officer

Rene Tegtmeyer
Acting Commissioner of Patents

FORM PO-1050 (10-69)